United States Patent
Wahl

(10) Patent No.: US 9,582,673 B2
(45) Date of Patent: Feb. 28, 2017

(54) SEPARATION OF DUTIES CHECKS FROM ENTITLEMENT SETS

(75) Inventor: Mark Wahl, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 12/890,712

(22) Filed: Sep. 27, 2010

(65) Prior Publication Data

US 2012/0079556 A1 Mar. 29, 2012

(51) Int. Cl.
*G06F 21/00* (2013.01)
*G06F 21/60* (2013.01)

(52) U.S. Cl.
CPC ................... *G06F 21/604* (2013.01)

(58) Field of Classification Search
USPC ............................................................ 726/1
See application file for complete search history.

(56) References Cited

U.S. PATENT DOCUMENTS

| | | | |
|---|---|---|---|
| 5,220,604 A * | 6/1993 | Gasser | G06F 21/6281 |
| 7,305,701 B2 | 12/2007 | Brezak et al. | |
| 7,506,102 B2 | 3/2009 | Lev-Ran et al. | |
| 8,196,187 B2 | 6/2012 | Kabat et al. | |
| 8,353,005 B2 | 1/2013 | Kabat et al. | |
| 2003/0204751 A1* | 10/2003 | Jindani et al. | 713/201 |
| 2005/0182935 A1 | 8/2005 | Morris et al. | |
| 2005/0209899 A1* | 9/2005 | King et al. | 705/8 |
| 2005/0251853 A1 | 11/2005 | Bhargavan et al. | |
| 2005/0289082 A1 | 12/2005 | Morris et al. | |
| 2006/0020679 A1 | 1/2006 | Hinton et al. | |
| 2006/0041743 A1 | 2/2006 | Della-Libera et al. | |
| 2006/0041929 A1 | 2/2006 | Della-Libera et al. | |
| 2006/0130127 A1 | 6/2006 | Kaler et al. | |
| 2006/0200424 A1 | 9/2006 | Cameron et al. | |
| 2006/0200866 A1 | 9/2006 | Cameron et al. | |

(Continued)

FOREIGN PATENT DOCUMENTS

| | | |
|---|---|---|
| WO | 2008025835 A1 | 3/2008 |
| WO | 2009000276 A1 | 12/2008 |

OTHER PUBLICATIONS

Weber, Hazen A., "Role-Based Access Control: The NIST Solution", Retrieved at << http://www.sans.org/reading_room/whitepapers/sysadmin/role-based-access-control-nist-solution_1270 >>, Version 1.4b, Oct. 8, 2003.

(Continued)

*Primary Examiner* — William Goodchild
(74) *Attorney, Agent, or Firm* — Kate Drakos; Aneesh Mehta; Micky Minhas

(57) ABSTRACT

A data model in which a set provides an abstraction that isolates the computation of membership from the details of how an enforcement point determines access (e.g., based on claims, based on security group membership etc). Set operations (e.g., intersection, union, inverse) can then be used across the sets. The architecture utilizes workflow on set transitions such that when an object such as a user enters the scope of one of these sets, notification can occur, such that inadvertent changes which lead to separation-of-duties violations can be detected quickly. The sets can also be used to define entitlements for enforcement of claims-based access control in a cross-organization deployment (e.g., to a cloud-hosted application).

20 Claims, 11 Drawing Sheets

(56) References Cited

U.S. PATENT DOCUMENTS

| | | |
|---|---|---|
| 2006/0253699 A1 | 11/2006 | Della-Libera et al. |
| 2006/0253700 A1 | 11/2006 | Della-Libera et al. |
| 2007/0061873 A1 | 3/2007 | Shewchuk et al. |
| 2007/0071243 A1 | 3/2007 | Nanda |
| 2007/0143835 A1 | 6/2007 | Cameron et al. |
| 2007/0150741 A1 | 6/2007 | Kaler et al. |
| 2007/0204168 A1 | 8/2007 | Cameron et al. |
| 2007/0220134 A1 | 9/2007 | Cameron et al. |
| 2008/0016232 A1 | 1/2008 | Yared et al. |
| 2008/0052102 A1* | 2/2008 | Taneja et al. ............ 705/1 |
| 2008/0066159 A1 | 3/2008 | Dillaway et al. |
| 2008/0086473 A1 | 4/2008 | Searl et al. |
| 2008/0163347 A1* | 7/2008 | Ratcliff ............ G06F 21/604 726/6 |
| 2008/0184339 A1 | 7/2008 | Shewchuk et al. |
| 2008/0189705 A1 | 8/2008 | Weinert et al. |
| 2008/0222096 A1 | 9/2008 | Ungureanasu et al. |
| 2008/0222714 A1 | 9/2008 | Wahl |
| 2008/0270339 A1 | 10/2008 | Copeland et al. |
| 2008/0271121 A1 | 10/2008 | Hinton et al. |
| 2009/0150981 A1* | 6/2009 | Amies et al. ............ 726/5 |
| 2009/0178123 A1 | 7/2009 | Carpenter et al. |
| 2009/0205016 A1 | 8/2009 | Milas |
| 2009/0300711 A1* | 12/2009 | Tokutani ............ G06F 21/554 726/1 |
| 2010/0043051 A1 | 2/2010 | Deputat et al. |
| 2010/0153932 A1 | 6/2010 | McMurtry et al. |
| 2010/0299738 A1 | 11/2010 | Wahl |

OTHER PUBLICATIONS

Takabi, et al., "Separation of Duty in Role-Based Access Control Model through Fuzzy Relations", Retrieved at << http://ieeexplore.ieee.org/stamp/stamp.jsp?arnumber=04299762 >>, Information Assurance and Security,Third International Symposium, Aug. 29-31, 2007.

"Oracle Identity Management 11g", Retrieved at << http://www.oracle.com/technology/products/id_mgmt/pdf/idm_ds_11g_r1.pdf >>.

Li, et al., "On Mutually-Exclusive Roles and Separation of Duty", Retrieved at << http://www.cs.purdue.edu/homes/ninghui/papers/sod-j.pdf >>, Proceedings of the 11th ACM conference on Computer and communications security, Oct. 25-29, 2004.

"Capability-based Security", Retrieved From<<https://en.wikipedia.org/wiki/Capability-based_security>>, Retrieved on: Feb. 24, 2009, 5 Pages.

"Superior Identity Management Features in Windows Server 2008 Enterprise and Windows Server 2008 Datacenter", Retrieved From <<http://download.microsoft.com/download/8/2/f/82fa3808-7168-46f1-a07b-f1a7c9cb4e85/WS08%20Identity%20Management %20Features%20White%20Paper_FINAL.doc>>, Dec. 2007, 14 Pages.

"Non Final Office Action Issued in U.S. Appl. No. 12/468,065", Mailed Date: Mar. 15, 2012, 11 Pages.

Anderson, Anne, "OASIS eXtensible Access Control Markup Language (XACML)", In Presentation to XML Community of Practice, Architecture and Infrastructure Committee of the CIO Council, Jun. 21, 2006, 24 Pages.

Berners-Lee, Tim, "Open Role Exchange Forum", Retrieved From <<https://web.archive.org/web/20090309040229/http://www.openroleexchange.org/>>, Retrieved on: Feb. 24, 2009, 1 Page.

Bertino, Elisa, "Digital Identity Management and Protection", In Proceedings of the International Conference on Privacy, Security and Trust: Bridge the Gap Between PST Technologies and Business Services, Oct. 30, 2006, 99 Pages.

Crawford, et al., "Developing Applications Using Windows Authorization Manager", Retrieved From <<https://msdn.microsoft.com/en-us/library/aa480244.aspx, Aug. 2006, 55 Pages.

Jones, Michael B., "The Identity Metasystem: A Use-Centric, Inclusive Web Authentication Solution", In Position Paper for the W3C Workshop on Transparency and Usability of Web Authentication, 2006, Mar. 2006, 5 Pages.

Patterson, Pat, "Superpatterns: Federated Authorization", Retrieved From <<https://web.archive.org/web/20070224124328/http://blogs.sun.com/superpat/entry/federated_authorization>>, Retrieved on: Feb. 24, 2009, 8 Pages.

* cited by examiner

SEPARATION OF DUTIES CHECKS FROM ENTITLEMENT SETS

BACKGROUND

Enterprises which are moving to a governance model for controlling access to sensitive information resources or are subject to regulatory requirements to limit access to this information to only authorized employees with a legitimate business need, must first understand the access model deployed in the enterprise information technology systems, such as file servers and collaboration sites. In many enterprises this has historically been an ad-hoc process, in which it is difficult to detect anomalous situations in which users do not have the correct access for the user role or users have received access entitlements which are atypical for the assigned role.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the import into a repository of configuration of two or more security enforcement points and normalization of the associated entitlements to create for each entitlement a set of users who currently receive a particular entitlement. The set is defined with an expression across the attributes of a user that determines whether the user is in the set.

The architecture also facilitates the import into the repository of the configuration of two or more role definitions, in which each role definition specifies the users who are in the role (with a similar pattern that is also based on an expression of the attributes of a user) and the entitlements which users in that role are to have, and those entitlements which a user in that role are not to have (because that entitlement is not appropriate for a user's role).

For each imported role-based entitlement, a set is defined which is relative to the imported sets and indicates the differences (users in the role and not receiving the entitlement); for each of the current entitlements, define a set which is relative to that set and the union of all role-based entitlements of users who are in that entitlement of users who currently receive that entitlement and are not granted that by any role. For each of the imported role-based entitlements that users in a role are not to have, a set is defined in which indicates the conflict in which a user has that current entitlement even though their role states they are not to have it.

For each of these relative sets, a report is specified of users currently in that set and a workflow process which is triggered by a user transitioning into that set, in which the trigger could occur either by a change to the user's attributes, a change to the security enforcement point configuration which is the result of a subsequent import, or a change to the role definition, and which results in a notification to an authorized person of a potential security policy violation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
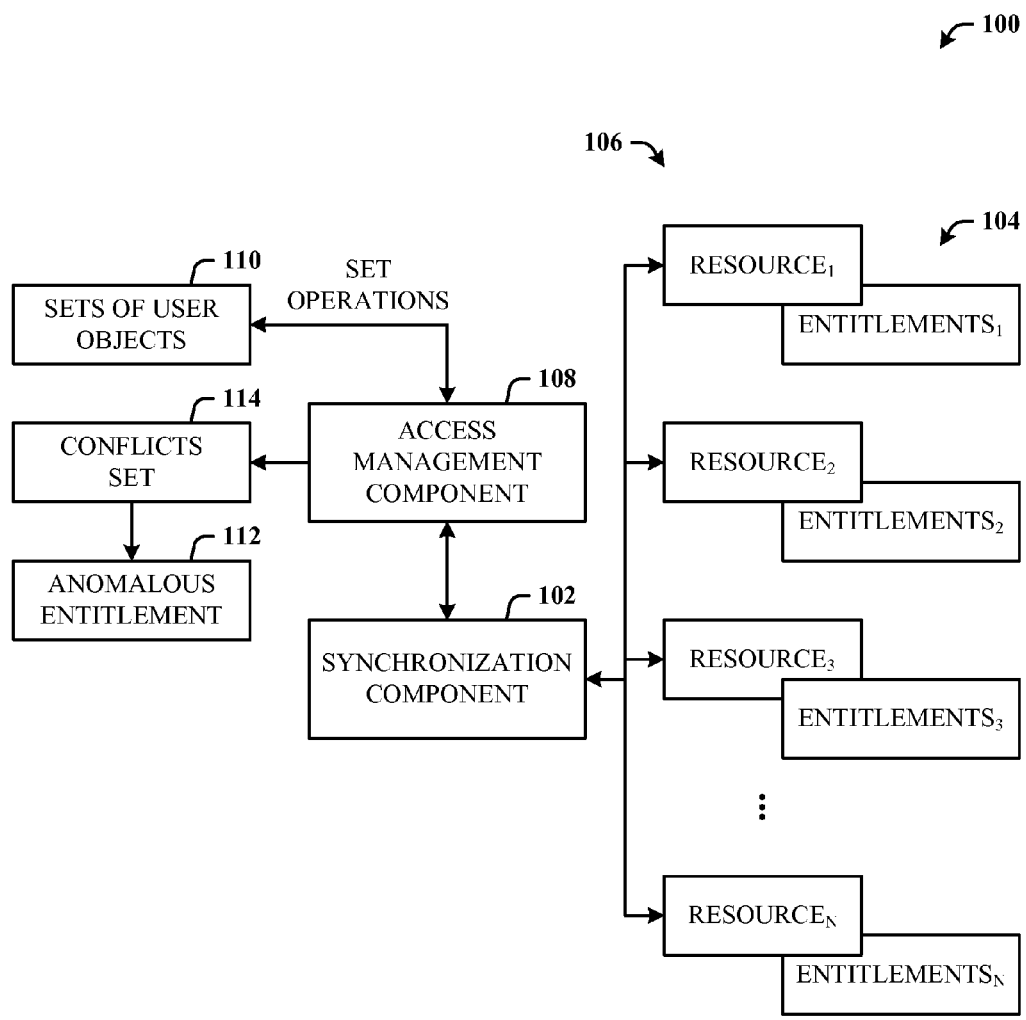
FIG. 1 illustrates an access check system in accordance with the disclosed architecture.

The disclosed architecture is a data model in which a set provides an abstraction that isolates the computation of membership from the details of how an enforcement point determines access (e.g., based on claims, based on security group membership etc). Set operations (intersection, union, inverse) can then be used across the sets. The architecture utilizes workflow on set transitions such that when an object such as a user enters the scope of one of these sets, notification can occur, such that inadvertent changes which lead to separation-of-duties (SOD) violations can be detected quickly. The sets can also be used to define entitlements (e.g., a user's ability to read a file or to submit a purchase order, etc.) for enforcement of claims-based access control in a cross-organization deployment (e.g., to a cloud-hosted application).

The entitlements can be obtained from disparate resources that utilize access rights such as security groups, access control lists (ACLs), sites, roles, and groups, rights policy templates, portal applications and associated permitted users, and rules for authoring claims-based applications, for example. The architecture evaluates and calculates effective entitlements, stores rights and entitlement memberships in a data warehouse, provides end-user reporting of current access rights (also referred to as in-place entitlements) for each resource and user, and provides an administrator a report of current and historical access rights for all resources and users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an access check system 100 in accordance with the disclosed architecture. The system 100 includes a synchronization component 102 that receives and normalizes entitlements 104 of users obtained from resources 106 having associated security enforcement points. The system 100 also includes an access management component 108 that creates sets of user objects 110 for the users of the entitlements 104 based on the normalized entitlements. The access management component 108 performs set operations on the sets of user objects 110 to check for an anomalous entitlement 112, as can be evidenced by a conflicts set 114 created by the set operations.

The anomalous entitlement 112 can be characterized by a user object associated with an entitlement, but not a role for the entitlement. The anomalous entitlement 112 can be characterized by a user object associated with a role, but not for an entitlement for the role. The set operations can include union, intersection, and inverse operations, for example.

The access management component 108 processes a set transition, which can be defined as when a user object enters scope of a set and sends a notification of the transition to address a separation-of-duties violation. The access management component 108 computes set differences and runs a workflow for a user object that has an anomalous entitlement 112. The access management component 108 utilizes the sets of user objects to define entitlements for enforcement of claims-based access control in an across-organization deployment. The access management component 108 creates an expression for a set of user objects that defines the set across attributes of a user. Additionally, the expression is utilized to determine whether a user is in the set.

More specifically, the disclosed architecture facilitates the import into a repository of a configuration of two or more security enforcement points and normalization of the associated entitlements to create for each entitlement a set of users (or user objects) who currently receive a particular entitlement. As previously indicated, the set is defined with an expression across the attributes of a user that determines whether the user is in the set.

The architecture also facilitates the import into the repository of a configuration of two or more role definitions, in which each role definition specifies the users who are in the role (with a similar pattern that is also based on an expression of the attributes of a user) and the entitlements which users in that role are to have, as well as those entitlements which a user in that role are not to have (those entitlements are not appropriate for a user's role).

For each imported role-based entitlement, a difference set (also referred to as the conflicts set 114) is defined which is relative to the imported sets and indicates the differences (e.g., users in the role and not receiving the entitlement). For each of the current entitlements, a set is defined which is relative to that set, and the union of all role-based entitlements of users who are in that entitlement of users who currently receive (also referred to as in-place entitlements) that entitlement and are not granted that by any role. For each of the imported role-based entitlements that users in a role are not to have, a set is defined in which indicates the conflict in which a user has that current entitlement even though their role states the users are not to have the entitlement.

For each of these relative sets, a report is specified of users currently in that set and a workflow process which is triggered by a user transitioning into that set, in which the trigger could occur either by a change to the user's attributes, a change to the security enforcement point configuration which is the result of a subsequent import, and/or a change to the role definition, and which results in a notification to an authorized person of a potential security policy violation.

The architecture can be realized as a series of steps related to setup, a first run and subsequent runs. With respect to setup, for a given enterprise, an enterprise administrator defines and provides a description of the enterprise roles, which includes patterns that characterize which users are associated with specific roles, the entitlements to be provided to users in given role, and the entitlements that users of a role should not have. The enterprise administrator can also define the workflow processes to be performed in response to detection of an anomalous entitlement. The architecture imports the role definitions and the user definitions into a consistent data model.

With respect to a first run, the architecture imports existing in-place (also referred as current) entitlements from connected sources (systems) that have security enforcement points. The existing in-place entitlements are mapped to a consistent data model, in which a set of users that receive each entitlement is expressed through a pattern. The architecture computes a set of differences and runs predefined workflow processes for users with anomalous entitlements. This can result in the enterprise administrator taking action to correct the entitlement in the connected system, changing the role definition, and/or changing the user attributes for users having the anomalous entitlements.

In subsequent runs, the following actions can performed repeatedly (e.g., on a scheduled basis such as weekly) based on trigger events. For example, the actions can be performed when triggered by a change in data in a connected system (of an enforcement point), and/or when triggered by an event that may indicate an anomalous access attempt. Subsequently, the architecture re-imports the role definitions, user definitions, and the in-place entitlements as a "full" import, or re-imports the changes to these definitions or entitlements which had been made in the connected system subsequent to the time of the previous import (as a "delta" import of the changes).

The existing in-place entitlements are re-mapped, and set transitions are computed for users entering the scope of a difference set of users that have an entitlement which is not part of a role. Predefined activities are performed from the workflow process, which occur when a user has been detected to have an anomalous entitlement.

Figure 2:
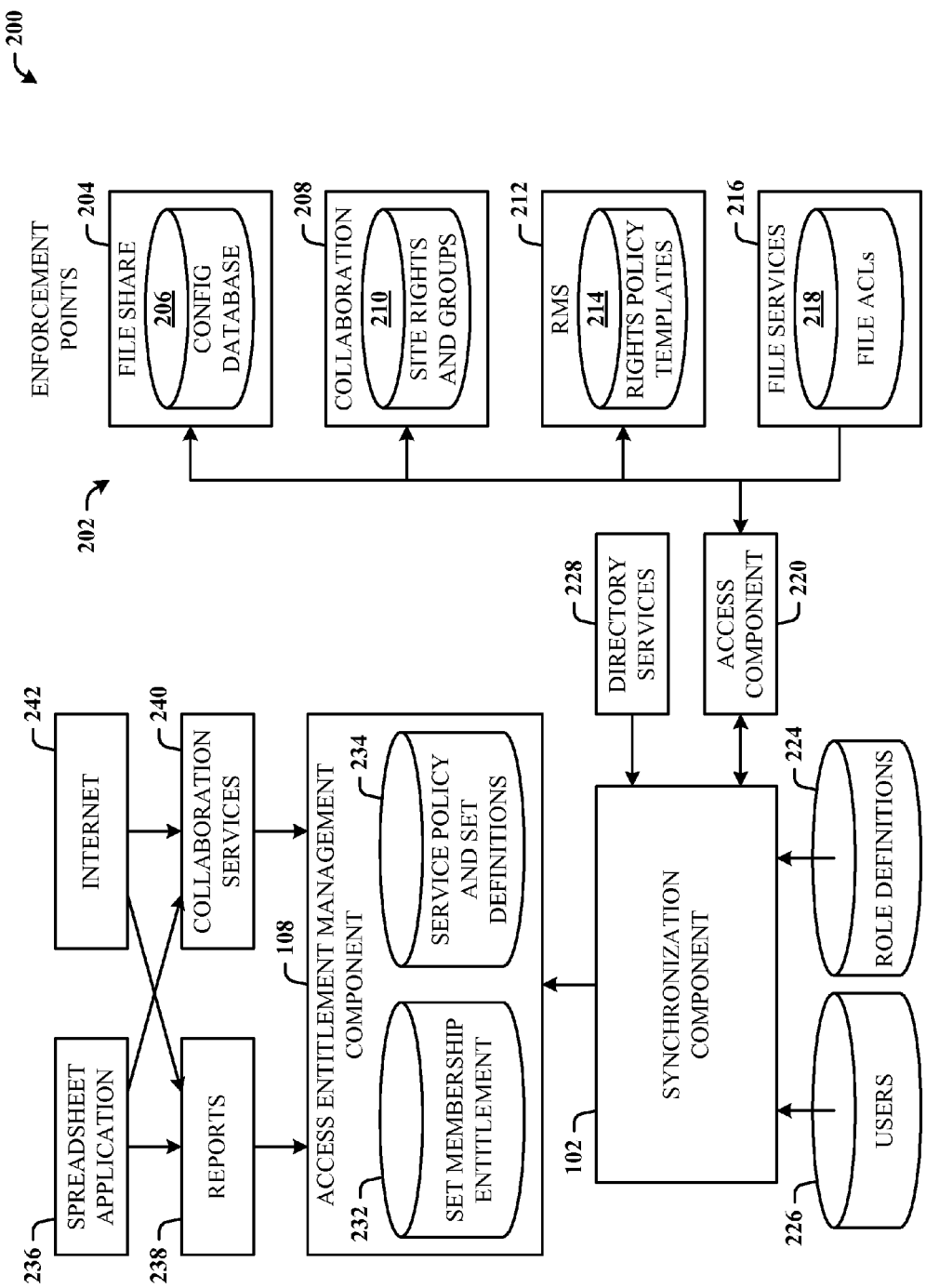
FIG. 2 illustrates an embodiment of a system that employs access checks for entitlements in accordance with the disclosed architecture.

FIG. 2 illustrates an embodiment of a system 200 that employs access checks for entitlements in accordance with the disclosed architecture. In this particular illustration, the system 200 includes multiple enforcement points 202, which include a file share source 204 having a configuration database 206, a collaboration source 208 that includes site rights and groups 210, a rights management service (RMS) source 212 that includes rights policy templates 214, and a file services source 216 that include file access control lists (ACLs) 218. It is to be understood that enforcement points other than those that are shown can be utilized as well such as an access gateway source.

An access component 220 provides communications between the enforcement points 202 and a synchronization component 102. The access component 220 can be a single management agent suitable for accessing each of the enforcement points 202 or multiple management agents each designed specific to a given enforcement point. The access component 220 can be employed to interface to the most popular access control policy formats (e.g., used by the Windows™ file system) and/or or various industry standard formats such as extensible access control markup language (XACML). The synchronization component 102 provides synchronization (also referred to as normalization) services with policies and entitlements from the enforcement points 202 and, role definitions 224 and users 226. The synchronization component 102 can receive data from a directory services component 228 (e.g., Active Directory™ by Microsoft Corporation) for synchronization as well.

The normalization process of enforcement point information can be performed on many different information types and formats. For example, one type of enforcement point information may be received as a distribution list, while another information type may be different than that.

The entitlements information can be extracted from many different information types for use by the access (entitlement) management component 108. All that data flows through the synchronization component 102 for normalization and is stored in the management component 108 as set membership entitlements 232 and service policy and set definitions 234. Thus, the management component 108 is continuously checking and updating entitlement objects and set definitions.

Generally, the enforcement information (policies and entitlements) is obtained from the enforcement points 202. Next, the policy(ies) are evaluated to determine the entitlements for the users. Then an entitlement object is created that has links to the original resource (enforcement point data such as a file), to a set of users who have that entitlement (determined by parsing), and to the mechanism itself in the policy that was imported from that system and forms the basis on which the entitlement was granted. Thus, the entitlement object provides the means for determining the cause of the violation (or anomalous entitlement).

Thus, an entitlement is represented as an object that is independent from the evaluation mechanisms of the enforcement points. An entitlement has associated therewith all the users that are the recipients of the entitlement, whether through a security group, a distribution list, etc. This allows the ability to dispute performed computations based on the relationships between different sets, different collections of users, and so on, which is beneficial for SOD checks to ensure against undesired entitlement anomalies (e.g., entitlements for creating a purchase order and approve the purchase order). For example, consider that a purchase order might use one system for submission and another system for approvals. By bringing these systems together in a consistent entitlement model, the relationships between the different sets of users can be evaluated to detect SOD violations for one or both systems.

The access entitlement management component 108 can then apply the entitlement checks (using the set membership entitlements 232 and service policy and set definitions 234) to other enterprise entities such as a spreadsheet application 236 that seeks to operate on data (e.g., SQL server data) to provide reports 238 or collaboration services 240 accessible via a network such as the Internet 242 for accessing the collaboration source 208.

Figure 3:
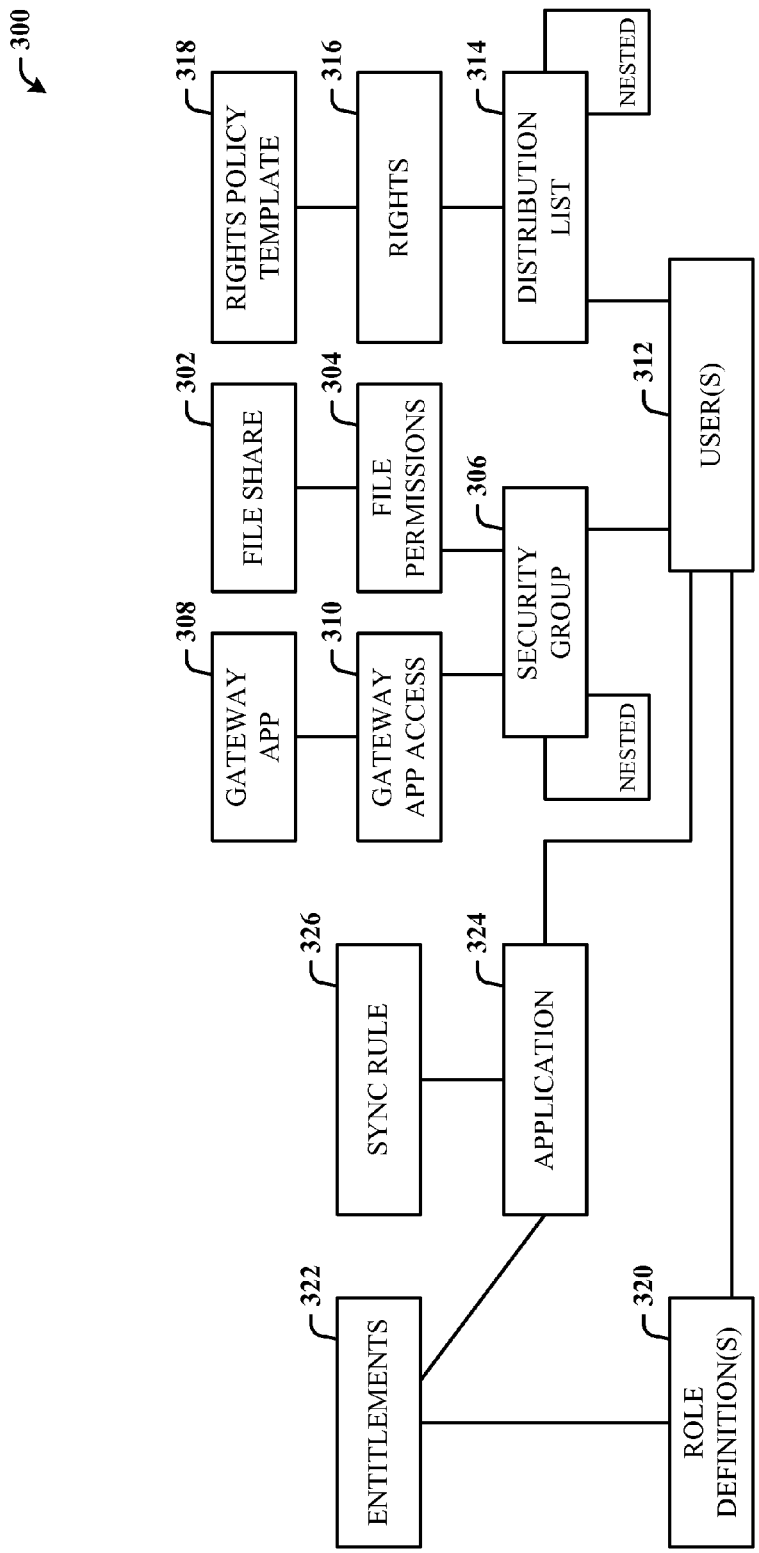
FIG. 3 illustrates a system the employs entitlement checks nested groups.

FIG. 3 illustrates a system 300 the employs entitlement checks nested groups. The system 300 illustrates the process for bringing in data about a file share 302. The file share 302 has a connection to the particular file permissions 304, which are relative to the members of a security group 306.

A gateway application 308 as an associated gateway access component 310 that controls access to the gateway application 308 relative to members of the security group 306 such as a user 312. The user 312 is also on a distribution list 314, which has rights 316 as defined by associated rights policy template(s) 318. The security group 306 is shown to include nested groups (e.g., a subgroup that contains users who are members), and the distribution list 314 is also shown to include nested lists.

Nested entities are difficult to manage conventionally when, in particular, looking at policies and a group having a specific entitlement. This becomes increasingly difficult for analyzing entitlements of a user who is a member of a group contained within a group.

The user(s) 312 (similar to users 226 of FIG. 2), associated role definition(s) 320 (similar to role definitions 224 of FIG. 2), and entitlements 322 (similar to the entitlements obtained from an enforcement system of the enforcement points 202 of FIG. 2) resulting from the normalization process are processed to determine if access can be provided to an application 324 based on a user provisioning policy for an application described in a synchronization rule 326.

Figure 4:
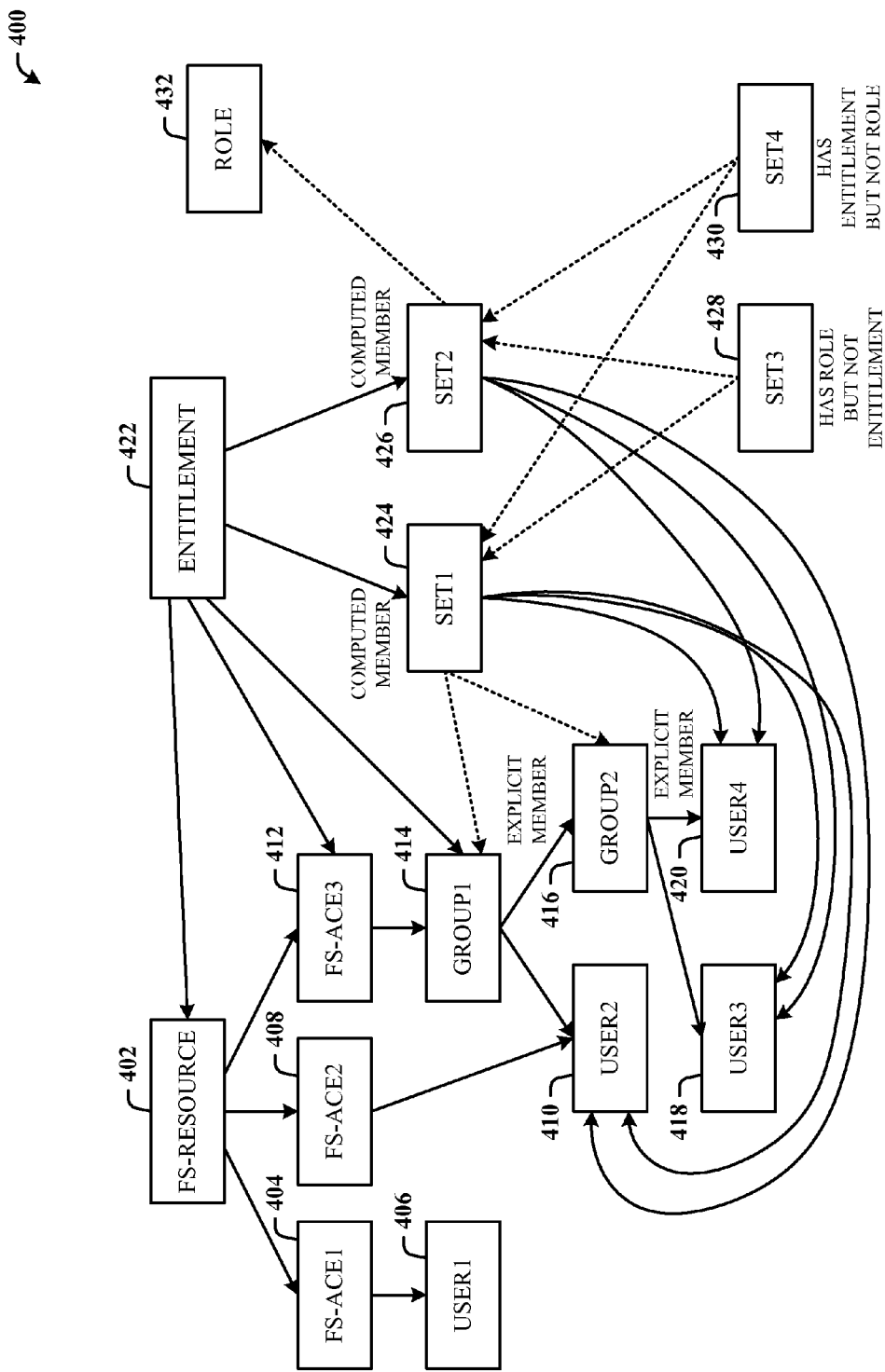
FIG. 4 illustrates a set relationship diagram for relationships established for a given entitlement and role.

FIG. 4 illustrates a set relationship diagram 400 for relationships established for a given entitlement and role. In this example, the enforcement point is for a financial services (FS) resource 402. The resource 402 is associated with three access control polices, referred to herein as access control entries (ACEs), that control access to an object by a trusted entity. The ACEs relate to users and groups. The resource 402 has a first ACE 404 for a first user 406, a second ACE 408 for a second user 410, and a third ACE 412 for a first group 414. The second ACE 408 controls access for the second user 410, which can be a member of the first group 414. Additionally, the first group 414 has a subgroup 416 as an explicit member. The subgroup 416 has a third user 418, and a fourth user 420 as an explicit member.

The particular entitlement 422 being considered is associated with the resource 402, the third ACE 412, the first group 414, first computed member set 424 and a second computed member set 426. The first computed member set 424 has relationships with the second user 410, the third user 418 and the fourth user 420. Additionally, the first computed member set 424 includes an expression (e.g., XPath—XML (extensible markup language) path language) that points to or defines a relationship with the first group 414 and the subgroup 416. Similarly, the second computed member set 426 has relationships with the second user 410, the third user 418 and the fourth user 420. Additionally, the second computed member set 426 includes an expression (e.g., XPath) that points to or defines a relationship with the role 432.

The disclosed architecture generates a third member set 428 and a fourth member set 430. The third member set 428 includes users who have the role 432 (e.g., as defined in the role definitions 320 of FIG. 3) but not the entitlement (as defined in the entitlements 322 of FIG. 3). The fourth member set 430 includes users who have the entitlement 422 but not the role 432. The third member set 428 includes an expression (e.g., XPath) that points to or defines relationships with the first member set 424 and the second member set 426. Similarly, fourth member set 430 includes an expression (e.g., XPath) that points to or defines relationships with the first member set 424 and the second member set 426.

The lines emanating from the entitlement 422 are all the individual users who through membership of a group are being referenced in an ACE have the entitlement 422. The second set 426 can be defined by an administrator, which is relative to a particular role rather than to a particular group. In this financial example, this can be a set of people who have a role, for example, being a finance manager.

The third set 428 and the fourth set 430 are the relationships computed as part of the SOD checks between the two computed member sets (424 and 426). Thus, the third set 428 is computed to determine users who have the entitlement 422 but not the role 432, and in the fourth set 428, users who have the role 432 but do not have the entitlement 422. For these set definitions, an administrator can specify workflows which are triggered by a transition of a user into these sets. If desired, the administrator can further specify additional sets which are relative to the sets with definitions of entitlements originating from two or more roles, and specify workflows for these sets in the same manner. For example, if there are two roles, finance manager and finance auditor, the administrator can define a new set of users, in which each user has an entitlement that is typically associated only with the finance manager role, the user does not have the finance manager role, but the user does have the finance auditor role, as this can indicate a potential separation of duties violation by this user across these two roles, and define a workflow to notify when a user transitions into this new set. This new set can be expressed as a combination using intersection and inverse operations of sets generated in this architecture.

Figure 5:
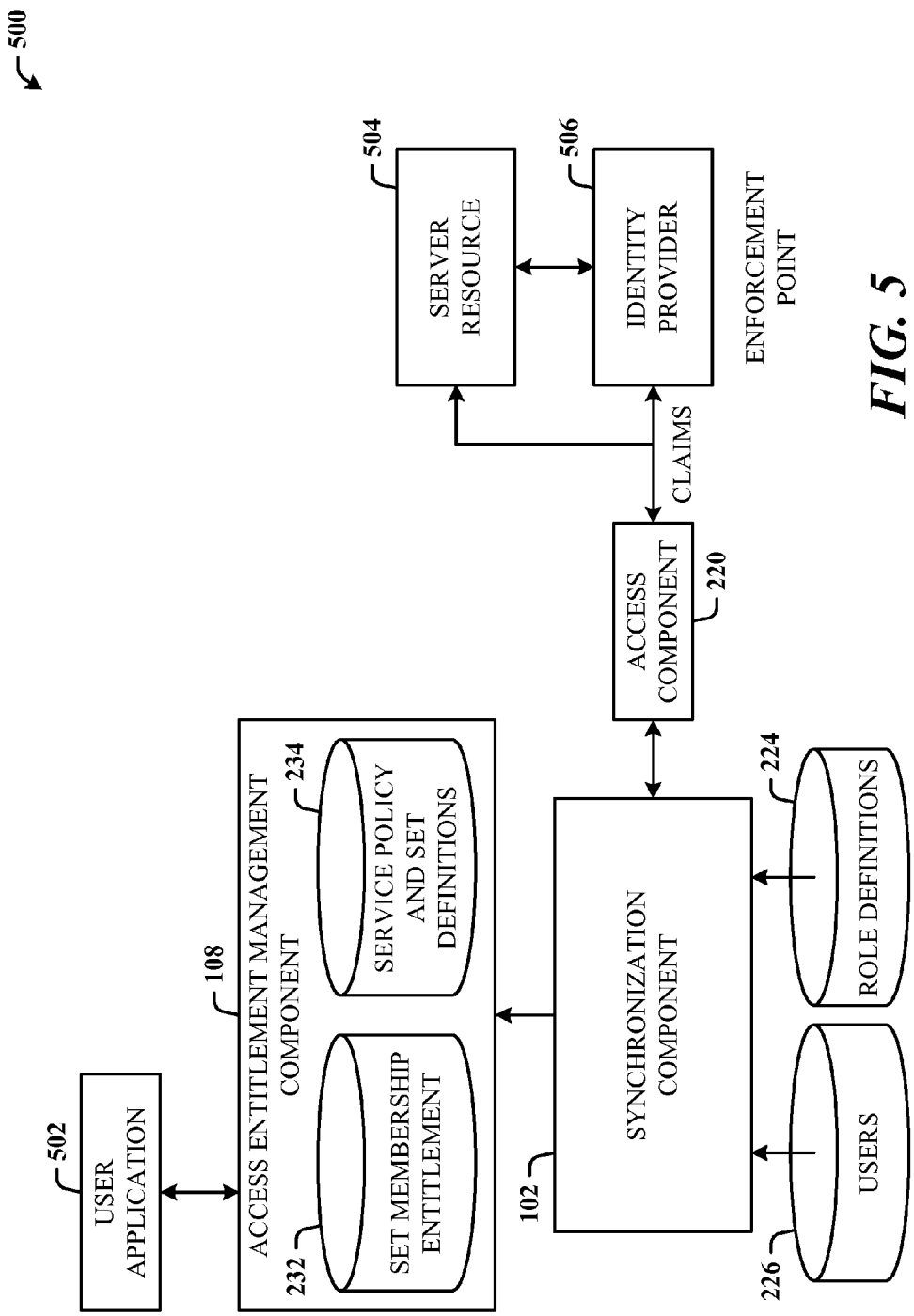
FIG. 5 illustrates a system that manages claims-based access in accordance with the disclosed architecture.

FIG. 5 illustrates a system 500 that manages claims-based access in accordance with the disclosed architecture. Here, a user application 502 seeks access to a server resource 504. Policies of the server resource 504 are handled by an identity provider 506, which enforces the access. The claims, which express user access rights to a server application, and optionally, how a user can request access rights they do not currently have, are passed to the access component 220 for synchronization (normalization) by the synchronization component 102 with users 226 and role definitions 224. The set membership entitlement(s) 232 and service policy and set definitions 234 are then updated to include the claims.

It can also be the case that the access rights are managed by the identity provider 506, but enforcement is then managed by the server resource 504.

Figure 6:
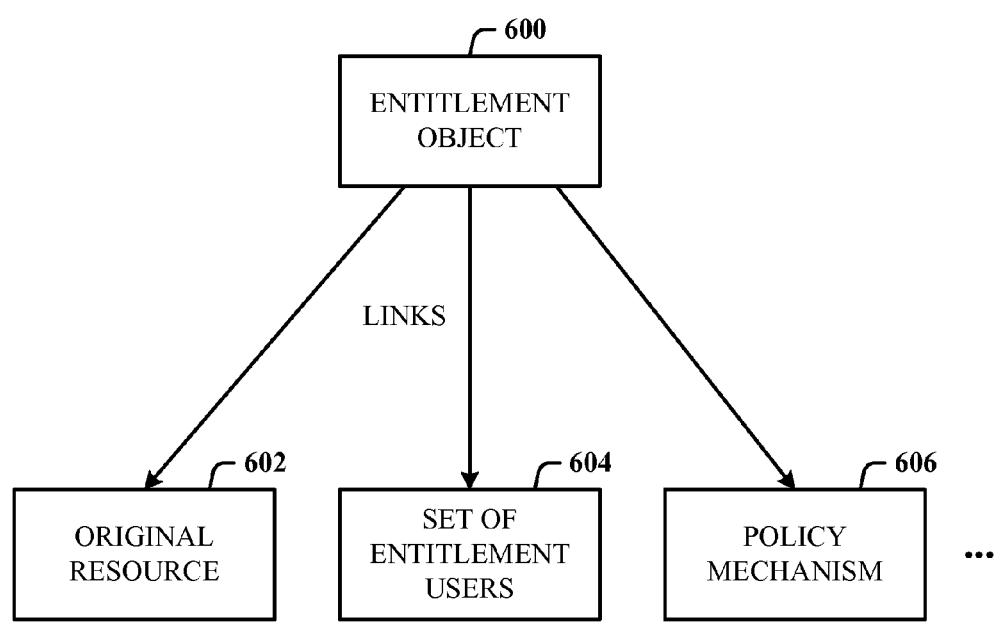
FIG. 6 illustrates an entitlement object and the associated links.

FIG. 6 illustrates an entitlement object 600 and the associated links. The entitlement object 600 is created with links to the original resource 602 (enforcement point data such as a file), to a set of entitlement users 604 who have that entitlement (determined by parsing), and to the policy mechanism 606 itself in the policy that was imported from that resource system and forms the basis on which the entitlement was granted.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
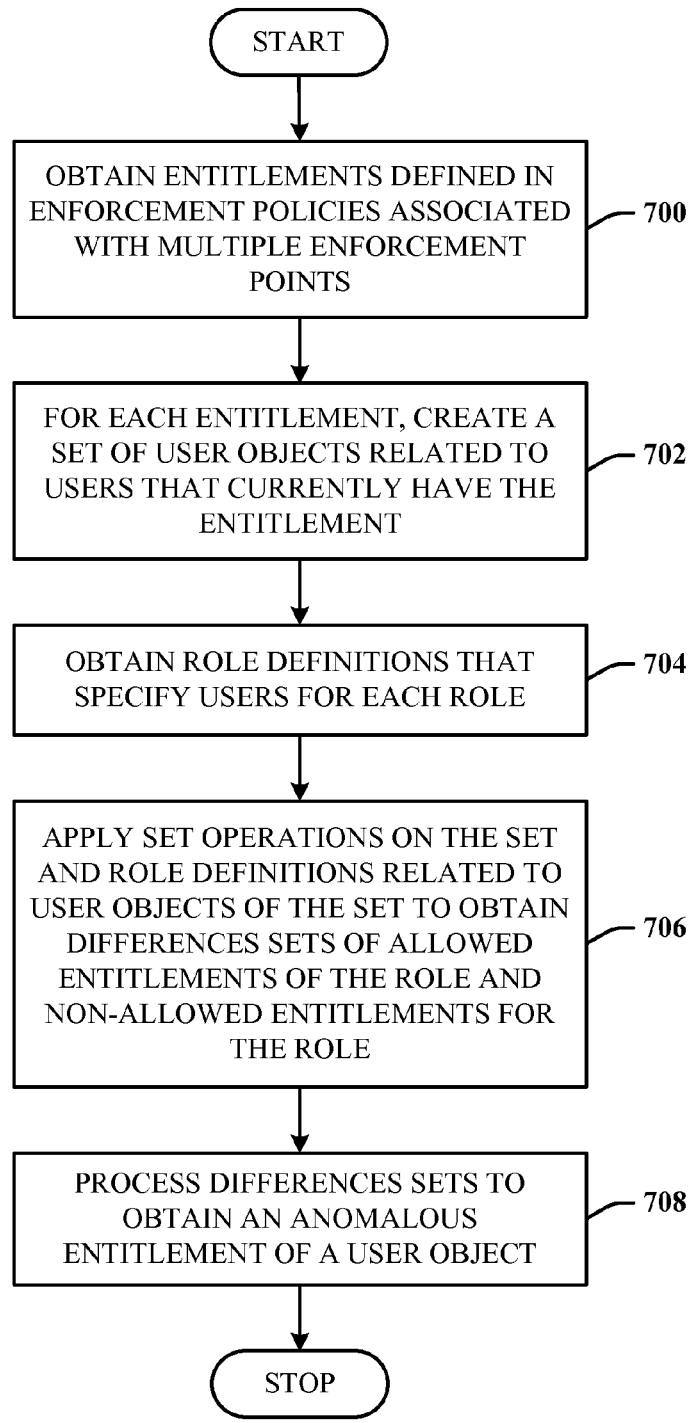
FIG. 7 illustrates a computer-implemented access check method in accordance with the disclosed architecture.

FIG. 7 illustrates a computer-implemented access check method in accordance with the disclosed architecture. At 700, entitlements defined in enforcement policies associated with multiple enforcement points are obtained. At 702, for each entitlement, a set of user objects related to users that currently have the entitlement is created. At 704, role definitions are obtained that specify users for each role. At 706, set operations are applied on the set and role definitions related to user objects of the set to obtain differences sets of allowed entitlements of the role and non-allowed entitlements for the role. At 708, the differences sets are processed to obtain an anomalous entitlement of a user object.

Figure 8:
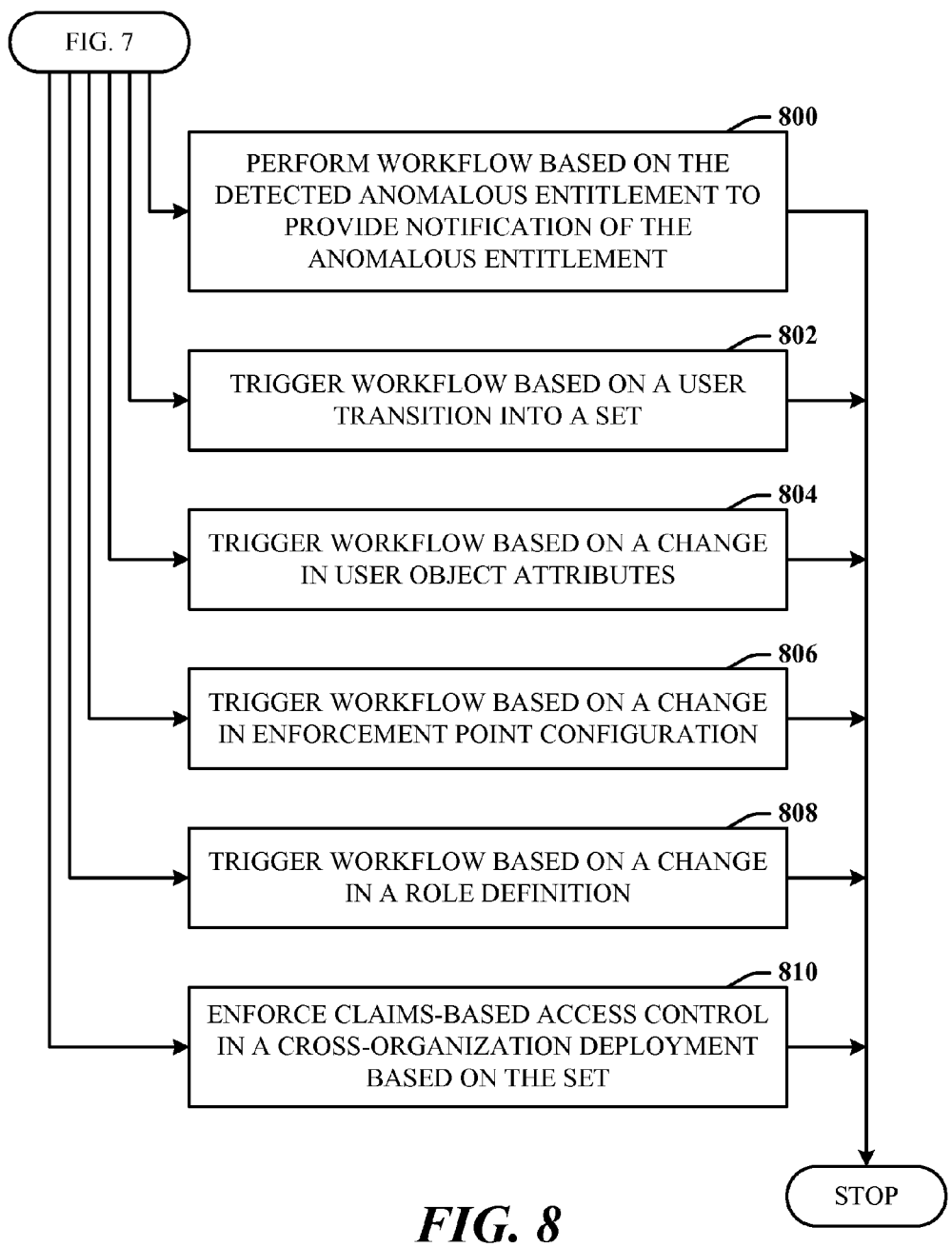
FIG. 8 illustrates further aspects of the method of FIG. 7.

FIG. 8 illustrates further aspects of the method of FIG. 7. Note that the flow indicates that each block represents a step that can be included, separately or in combination with other blocks, as additional aspects of the method represented by the flow chart of FIG. 7. At 800, a workflow is performed based on the detected anomalous entitlement to provide notification of the anomalous entitlement. At 802, the workflow is triggered based on a user transition into a set. At 804, the workflow is triggered based on a change in user object attributes. At 806, the workflow is triggered based on a change in enforcement point configuration. At 808, the workflow is triggered based on a change in a role definition. At 810, claims-based access control is enforced in a cross-organization deployment based on the set.

Figure 9:
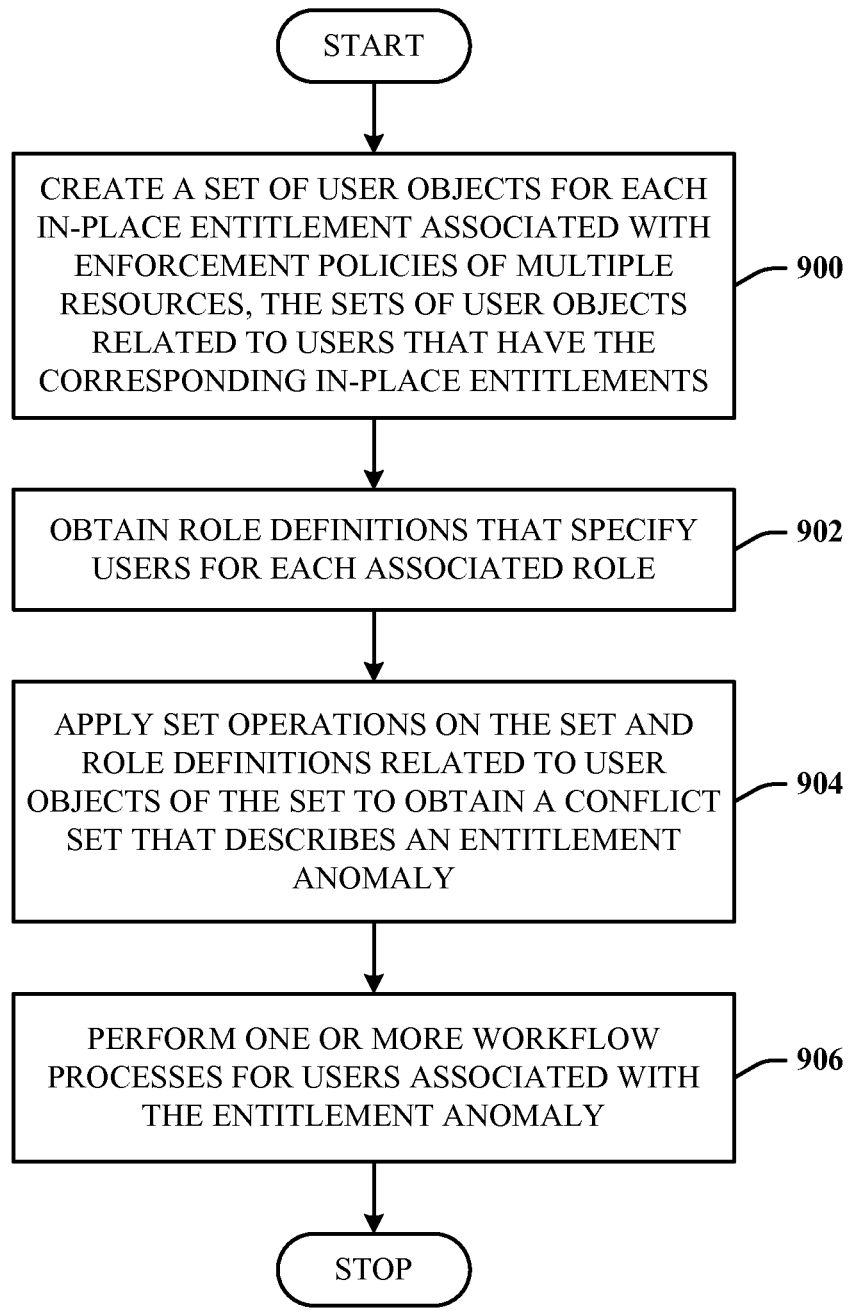
FIG. 9 illustrates an alternative access check method.

FIG. 9 illustrates an alternative access check method. At 900, a set of user objects is created for each in-place entitlement associated with enforcement policies of multiple resources. The set of user objects is related to users that have the corresponding in-place entitlements. At 902, role definitions are obtained that specify users for each associated role. At 904, set operations are applied on the set and role definitions related to user objects of the set to obtain a conflict set that describes an entitlement anomaly. At 906, one or more workflow processes are performed for users associated with the entitlement anomaly.

Figure 10:
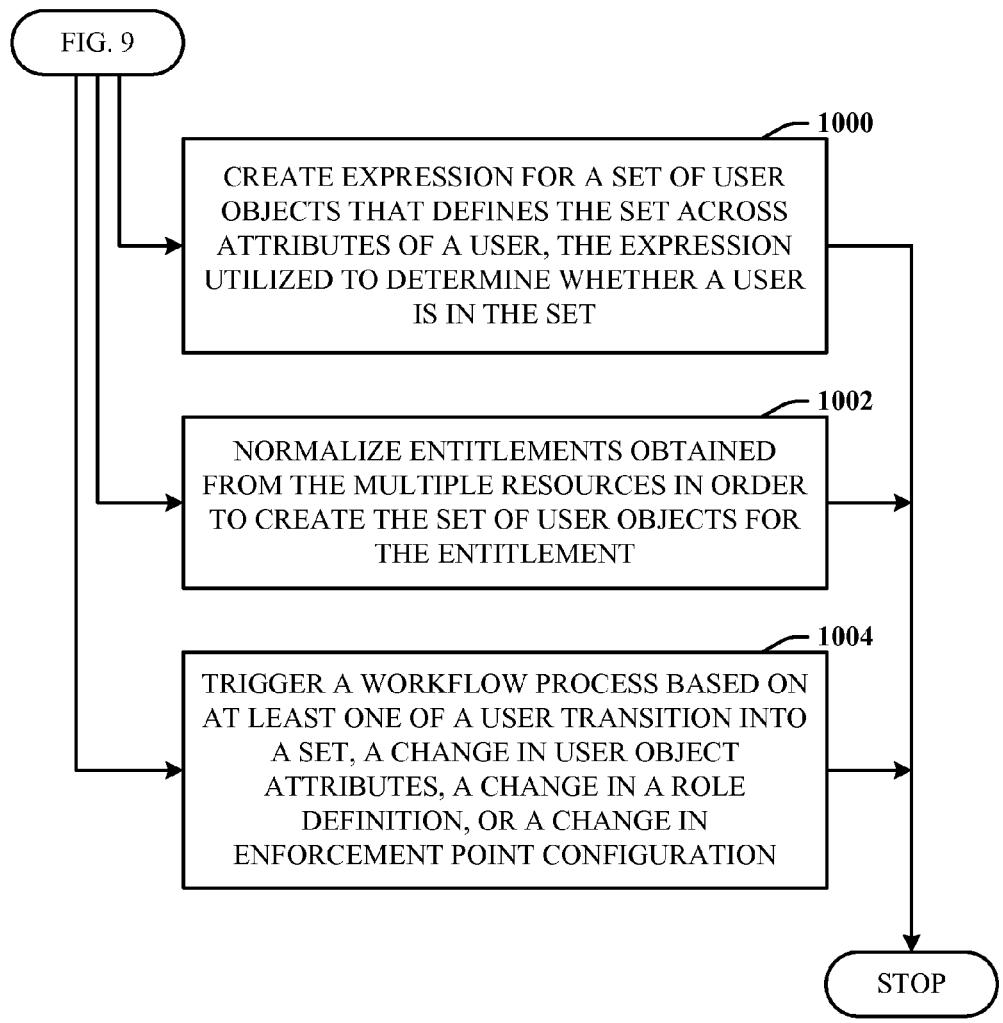
FIG. 10 illustrates further aspects of the method of FIG. 9.

FIG. 10 illustrates further aspects of the method of FIG. 9. Note that the flow indicates that each block represents a step that can be included, separately or in combination with other blocks, as additional aspects of the method represented by the flow chart of FIG. 9. At 1000, an expression is created for a set of user objects that defines the set across attributes of a user, the expression utilized to determine whether a user is in the set. At 1002, the entitlements obtained from the multiple resources are normalized in order to create the set of user objects for the entitlement. At 1004, a workflow process is triggered based on at least one of a user transition into a set, a change in user object attributes, a change in a role definition, or a change in enforcement point configuration. The set creation is separate from enforcement point access processing.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
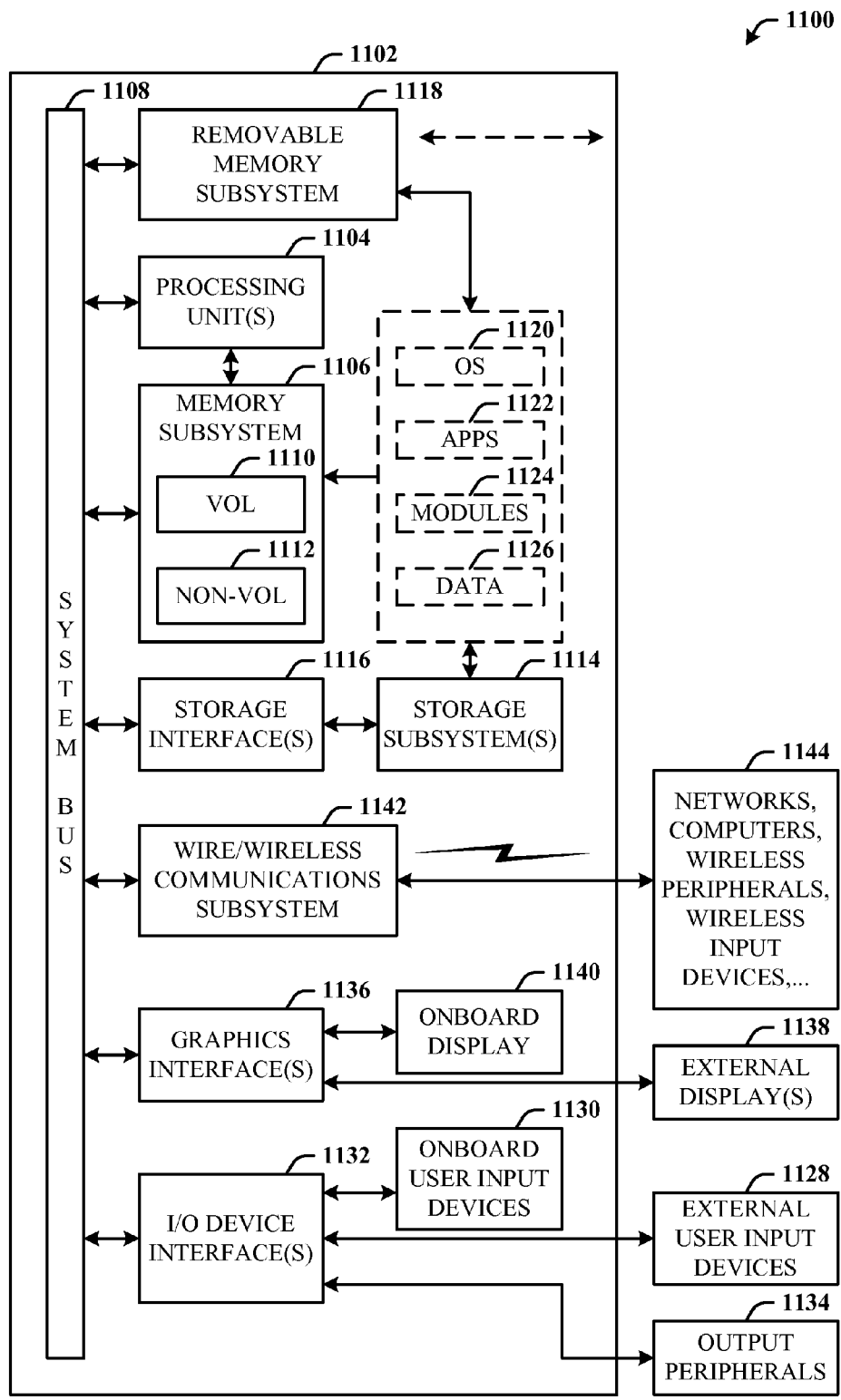
FIG. 11 illustrates a block diagram of a computing system that executes access checks in accordance with the disclosed architecture.

Referring now to FIG. 11, there is illustrated a block diagram of a computing system 1100 that executes access checks in accordance with the disclosed architecture. In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a computer-readable storage such as a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include computer-readable storage (physical storage media) such as a volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The one or more application programs 1122, other program modules 1124, and program data 1126 can include the entities and components of the system 100 of FIG. 1, the entities and components of the system 200 of FIG. 2, the entities and components of the system 300 of FIG. 3, the entities and flow of the set relationship diagram 400 of FIG. 4, the entities and components of the system 500 of FIG. 5, the entitlement object and links of FIG. 6, and the methods represented by the flowcharts of FIGS. 7-10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1102 and includes volatile and non-volatile internal and/or external media that is removable or non-removable. For the computer 1102, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented access check system, comprising:

a hardware processor and a memory, the hardware processor configured to execute instructions in the memory that enable, an interface that:

receives entitlement data that includes definitions of user entitlements for respective resources, from a plurality of disparate sources, and that normalizes the entitlement data; and an access entitlement manager that:

generates sets of user objects, each of the respective sets of the user objects generated as a respective expression that defines in-common values of in-common attributes across users receiving a respective user entitlement for a respective resource, the in-common values of the in-common attributes defining whether a respective user is in the each respective set, based on the normalized entitlement data, and that performs set operations on the sets of user objects, the set operations performed on the respective expressions that define the in-common values of the in-common attributes, to check for anomalous entitlement data by generating a conflicts set via the set operations.

2. The system of claim 1, wherein the anomalous entitlement data is characterized by a user object associated with one of the user entitlements but not associated with a role for the one of the user entitlements.

3. The system of claim 1, wherein the anomalous entitlement data is characterized by a user object associated with a role but not associated with one of the user entitlements for the role.

4. The system of claim 1, wherein the set operations include union, intersection, and inverse operations.

5. The system of claim 1, wherein the access entitlement manager processes a set transition when a first user enters scope of a set and sends a notification of the transition to address a separation-of-duties violation.

6. The system of claim 1, wherein the access entitlement manager computes set differences and runs a workflow for a user object that has anomalous entitlement data.

7. The system of claim 1, wherein the access entitlement manager utilizes the sets of user objects to define entitlement data for enforcement of claims-based access control in an across-organization deployment.

8. The system of claim 1, wherein the access entitlement manager creates the expression for a set of user objects that defines the set across the in-common attributes of the users, the expression utilized to determine whether a particular user is in the set.

9. A computer-implemented access check method performed by a computer system executing machine-readable instructions, the method, comprising acts of:

obtaining definitions of user entitlements defined in enforcement policies associated with multiple enforcement points;

for each entitlement, generating a set of user objects that defines users that currently have the user entitlement, the set generated as an expression that defines in-common values of in-common attributes across users receiving the user entitlement for a resource, the in-common values of the in-common attributes defining whether a respective user is in the set;

obtaining role definitions that specify users for each role;

performing set operations on the set and role definitions to obtain differences sets of allowed entitlements of the role and non-allowed entitlements for the role, the set operations performed using the respective expressions that define the in-common values of the in-common attributes;

processing the differences sets to obtain an anomalous entitlement of a user object; and configuring at least one processor to perform at least one of the acts of obtaining, creating, applying, or processing.

10. The method of claim 9, further comprising performing a workflow based on the detected anomalous entitlement to provide notification of the anomalous entitlement.

11. The method of claim 10, further comprising triggering the workflow based on a user transition into a set.

12. The method of claim 10, further comprising triggering the workflow based on a change in user object attributes.

13. The method of claim 10, further comprising triggering the workflow based on a change in enforcement point configuration.

14. The method of claim 10, further comprising triggering the workflow based on a change in a role definition.

15. The method of claim 9, further comprising enforcing claims-based access control in a cross-organization deployment based on the set.

16. A computer-implemented access check method performed by a computer system executing machine-readable instructions, the method, comprising acts of:

generating a respective set of user objects for each respective in-place user entitlement associated with enforcement policies of multiple resources, the respective sets of user objects related to respective users that have corresponding in-place user entitlements, each of the respective sets of the user objects generated as a respective expression that defines in-common values of in-common attributes across users receiving a respective user entitlement for a respective resource, the in-common values of the in-common attributes defining whether a respective user is in the set;

obtaining role definitions that specify in-common values of in-common attributes of respective users for each associated role;

performing set operations on the set and role definitions related to user objects of the set, the set operations using the respective expressions that define the in-common values of the in-common attributes, to obtain a conflict set that describes an entitlement anomaly;

performing one or more workflow processes for users associated with the entitlement anomaly; and configuring at least one processor to perform at least one of the acts of creating, obtaining, applying, or performing.

17. The method of claim 16, further comprising creating expression for a set of user objects that defines the set across attributes of a user, the expression utilized to determine whether a user is in the set.

18. The method of claim 16, further comprising normalizing the entitlements obtained from the multiple resources in order to create the set of user objects for the entitlement.

19. The method of claim 16, further comprising triggering a workflow process based on at least one of a user transition into a set, a change in user object attributes, a change in a role definition, or a change in enforcement point configuration.

20. The method of claim 16, wherein set creation is separate from enforcement point access processing.

* * * * *